(12) United States Patent
Huang et al.

(10) Patent No.: US 7,615,976 B2
(45) Date of Patent: Nov. 10, 2009

(54) SWITCHING CIRCUIT OF POWER CONVERTER HAVING VOLTAGE-CLIPPING DEVICE TO IMPROVE EFFICIENCY

(75) Inventors: Chih-Feng Huang, Jhubei (TW); Chiu-Chih Chiang, Hsinchu (TW); You-Kuo Wu, Sijhih (TW); Wei-Hsuan Huang, Taoyuan (TW); Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 81 days.

(21) Appl. No.: 11/407,537

(22) Filed: Apr. 19, 2006

(65) Prior Publication Data

US 2007/0247225 A1 Oct. 25, 2007

(51) Int. Cl.
*G05F 1/00* (2006.01)
(52) U.S. Cl. .................. 323/273; 323/270; 323/271
(58) Field of Classification Search ................. 323/271, 323/273, 270; 439/19; 330/253
See application file for complete search history.

(56) References Cited

U.S. PATENT DOCUMENTS 7,208,924 B2 * 4/2007 Toyoshima et al. ......... 323/271
2003/0178976 A1 * 9/2003 Xi ............................. 323/273
2003/0234636 A1 * 12/2003 Ruan et al. .................. 323/271
2004/0113595 A1 * 6/2004 Sugiura ...................... 323/273
2005/0162140 A1 * 7/2005 Hirst .......................... 323/273
2006/0158164 A1 * 7/2006 Kojima et al. .............. 323/273

FOREIGN PATENT DOCUMENTS

CN 1661812 8/2005

* cited by examiner

*Primary Examiner*—Edward Tso
*Assistant Examiner*—Arun Williams
(74) *Attorney, Agent, or Firm*—J.C. Patents

(57) ABSTRACT

A switching circuit for power converters is presented. It includes a voltage-clipping device, a resistive device, a first transistor and a second transistor. The voltage-clipping device is coupled to an input voltage. The first transistor is connected in series with the voltage-clipping device for switching the input voltage. The second transistor is coupled to control the first transistor and the voltage-clipping device in response to a control signal. The resistive device provides a bias voltage to turn on the voltage-clipping device and the first transistor when the second transistor is turned off. Once the second transistor is turned on, the first transistor is turned off and the voltage-clipping device is negatively biased. The voltage-clipping device is developed to clamp a maximum voltage for the first transistor.

6 Claims, 3 Drawing Sheets

SWITCHING CIRCUIT OF POWER CONVERTER HAVING VOLTAGE-CLIPPING DEVICE TO IMPROVE EFFICIENCY

BACKGROUND OF THE INVENTION

1. Field of the Invention

The present invention relates to a switching circuit. More particularly, the present invention relates to a switching circuit for power converters.

2. Description of Related Art

FIG. 1 shows a traditional switching circuit. When the power converter is turned on, a voltage $V_{CC}$ is supplied from a high voltage source $V_{IN}$ to a control circuit 10 of the power converter via a transistor 11. Once the control circuit 10 starts to operate, it is powered by a transformer winding 100 via a diode 90 and a capacitor 70. After that, the transistor 11 will be turned off for saving power consumption. The transistor 12 is used to control the on/off operation of the transistor 11. A resistor 15 is used to provide a bias voltage to turn on the transistor 11. A control signal $S_N$ Controls the transistor 12 via an inverter 14. As the control signal $S_N$ is disabled, the transistor 12 is turned on to switch off the transistor 11. However, when the transistor 12 is turned on, the resistor 15 will consume a power $P_R$, which is given by, $$P_R = \frac{V_{IN}^2}{R_{15}} \quad (1)$$

where $R_{15}$ is a resistance of the resistor 15.

A high input voltage $V_{IN}$ is generally supplied from an AC line voltage. Via the rectification, the voltage of the input voltage $V_{IN}$ would be approximately as high as $350V_{DC}$ when AC line voltage is high, such as $264V_{AC}$. Therefore, a significant power loss will be resulted from the resistor 15. The resistor 15 with mega ohms in resistance can reduce the power loss. However such high resistance resistor is not suitable to be built into an integrated circuit. Therefore, it is desirable to develop a higher efficiency switching circuit, especially for an integrated circuit for high voltage switching.

SUMMARY OF THE INVENTION

The present invention provides a switching circuit for power converters. It includes a voltage-clipping device, a resistive device, a first transistor and a second transistor. The voltage-clipping device is supplied with an input voltage. The first transistor is connected in series with the voltage-clipping device to switch the input voltage. The second transistor controls the first transistor and the voltage-clipping device in response to a control signal. The resistive device provides the bias voltage to turn on the voltage-clipping device and the first transistor when the second transistor is turned off. Once the second transistor is turned on, the first transistor is turned off and the voltage-clipping device is negatively biased. The voltage-clipping device is provided to clamp a maximum voltage for the first transistor.

The voltage-clipping device is an integrated circuit device built in a P-type substrate. A diffusion region having N-type ions forms an N-type well in the P-type substrate. An input diffusion region containing N+-type ions forms an input region in the N-type well. An output diffusion region having N+-type ions forms an output region in the N-type well. A P-type field block is formed in the N-type well. The P-type field block is disposed adjacent to the input region for generating junction fields. An isolated P-type well is formed in the N-type well and disposed adjacent to the output region. A control diffusion region containing P+-type ions forms a control region in the isolated P-type well. A conduction channel is therefore formed between the input region and the output region. The control region controls a width of the conduction channel for controlling a current flow in the conduction channel.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings.

FIG. 6 shows the signal flow when the switching circuit is turned on.

DETAILED DESCRIPTION OF THE INVENTION

Figure 1:
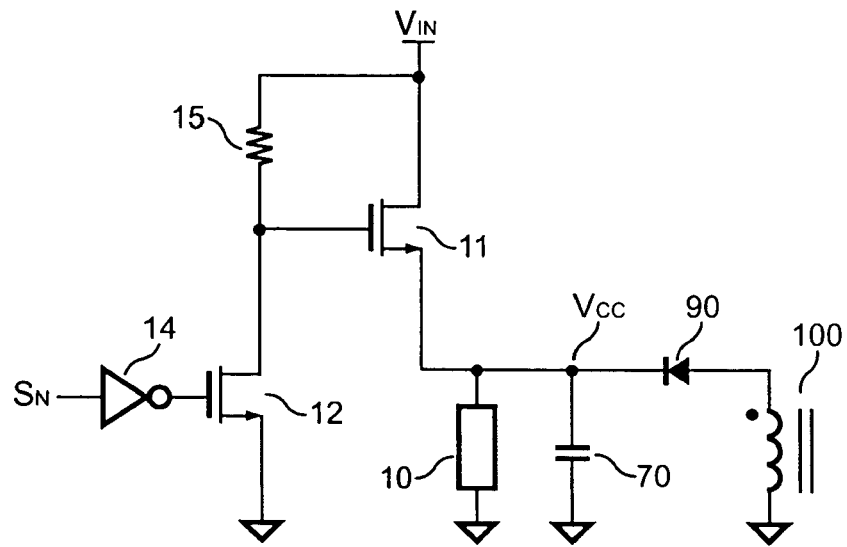
FIG. 1 shows a traditional switching circuit for power converters.
Figure 2:
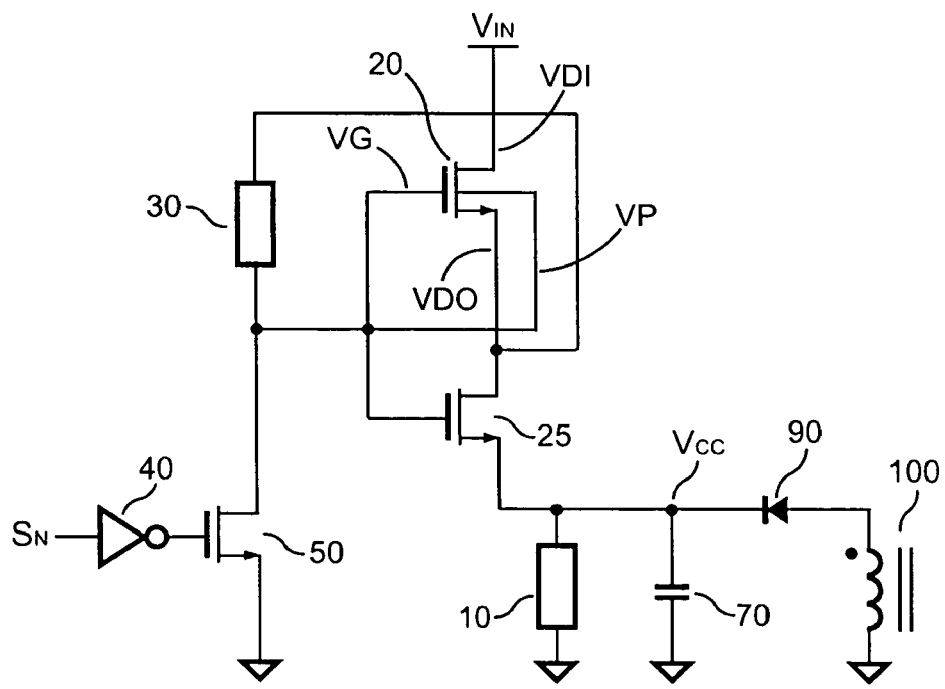
FIG. 2 shows a switching circuit for power converters according to a preferred embodiment of the present invention.

FIG. 2 shows a preferred embodiment of a switching circuit according to the present invention. It comprises a voltage-clipping device 20, a resistive device 30, a transistor 25 and a transistor 50. The voltage-clipping device 20 has an input terminal VDI, an output terminal VDO, a control terminal VP and a gate terminal VG. The gate terminal VG is connected with the control terminal VP. The input terminal VDI is connected to an input voltage source $V_{IN}$. The transistor 25 is connected in series with the voltage-clipping device 20 to switch the input voltage $V_{IN}$ and provide a supply voltage $V_{CC}$ to a control circuit 10 of the power converter. A drain terminal of the transistor 25 is connected to the output terminal VDO of the voltage-clipping device 20. A source terminal of the transistor 25 is coupled to switch the input voltage $V_{IN}$ to the control circuit 10. In order to turn on the voltage-clipping device 20 and the transistor 25, the resistive device 30 is connected between the control terminal VP and the output terminal VDO of the voltage-clipping device 20. Moreover, the resistive device 30 is connected between the drain terminal and a gate terminal of the transistor 25. The resistive device 30 therefore provides a bias voltage for the voltage-clipping device 20 and the transistor 25. The resistive device 30 can be implemented by a resistor or a plurality of transistors. When the control circuit 10 starts to operate, a further supply voltage is provided from a transformer winding 100 to the control circuit 10 through a diode 90 and a capacitor 70. After that, the input voltage $V_{IN}$ will be cut off via the voltage-clipping device 20 and the transistor 25 for saving power consumption.

A control signal $S_N$ is connected to the switching circuit to switch the input voltage $V_{IN}$. A gate terminal of the transistor 50 is driven by the control signal $S_N$ via an inverter 40. A drain terminal of the transistor 50 is connected to a gate terminal of the transistor 25 and the control terminal VP of the voltage-clipping device 20. Therefore the resistive device 30 provides bias voltage to turn on the transistor 25 and the voltage-clipping device 20 when the transistor 50 is turned off. Once the transistor 50 is turned on, the transistor 25 is turned off to cut off the conduction from the input voltage $V_{IN}$ to the control circuit 10. Meanwhile, the resistive device 30 provides a negative bias to the voltage-clipping device 20. The voltage-clipping device 20 is used for clamping a maximum voltage for the transistor 25.

Figure 3:
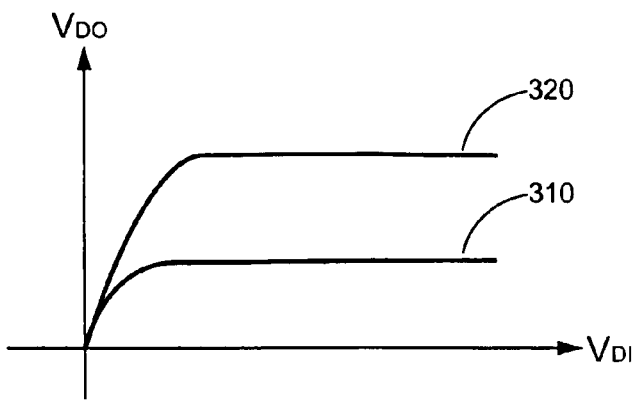
FIG. 3 shows input-to-output characteristic properties of the voltage-clipping device.

FIG. 3 shows the preferred characteristic properties of the voltage-clipping device 20. When a voltage applied to the input terminal VDI, the output voltage at the output terminal VDO will be clamped in response to the voltage increment at the input terminal VDI. A curve 310 indicates a negative bias is applied to the control terminal VP. A curve 320 shows a floating voltage is generated at the control terminal VP. A lower voltage applied to the voltage-clipping device 20 will result in a lower clamping voltage.

Figure 4:
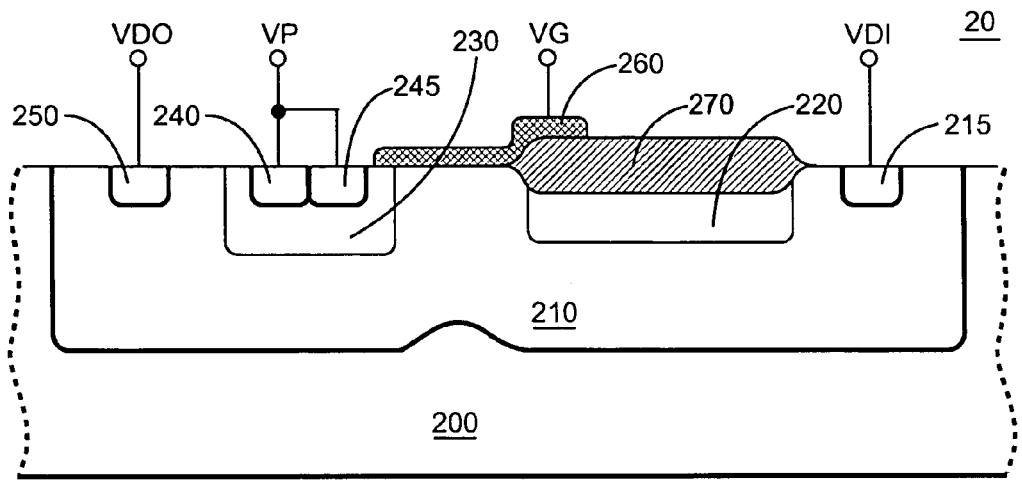
FIG. 4 is a cross-sectional view of a voltage-clipping device according to a preferred embodiment of the present invention.

FIG. 4 shows a cross-sectional view of the voltage-clipping device 20 according to a preferred embodiment of the present invention. The voltage-clipping device 20 is built in a P-type substrate 200. A first diffusion region 21a and a second diffusion region 21b having N-type ions form an N-type well 210 in the P-type substrate 200. An input diffusion region containing N+-type ions forms an input region 215 in the first diffusion region 21a. The input region 215 is further coupled to the input terminal VDI. An output diffusion region having N+-type ions forms an output region 250 in the second diffusion region 21b. The output region 250 is further coupled to the output terminal VDO. The N-type well 210 formed by the second diffusion region 21b produces a low-impedance path for the output region 250, and restricts the current flow in between the input region 215 and the output region 250. A P-type field block 220 is formed in the N-type well 210. The P-type field block 220 is disposed adjacent to the input region 215 for generating junction fields. An isolated P-type well 230 is formed in the N-type well 210. The isolated P-type well 230 is formed in the second diffusion region 21b. A control diffusion region containing P+-type ions forms a first control region 240 in the isolated P-type well 230. Another control diffusion region containing N+-type ions forms a second control region 245 in the isolated P-type well 230. The first control region 240 and the second control region 245 are coupled to the control terminal VP.

Figure 5:
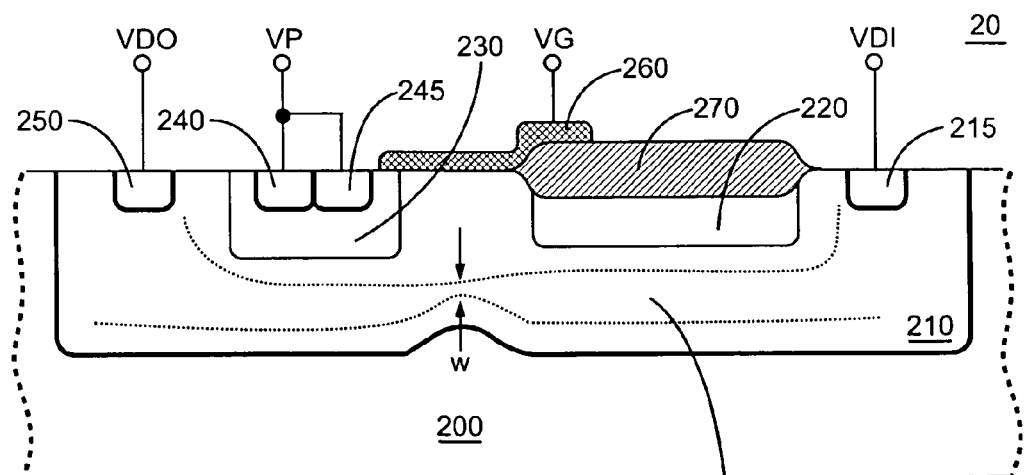
FIG. 5 shows a conduction channel of the voltage-clipping device.

FIG. 5 shows a conduction channel 300 formed between the input region 215 and the output region 250. The control region 240 controls a width w of the conduction channel 300 for controlling a current flow from the input terminal VDI to the output terminal VDO. A thin gate oxide 260 and a thick field oxide 270 are formed over the P-type substrate 200. A gate terminal VG is coupled to the thin gate oxide 260. The gate terminal VG provides a further control for the conduction channel 300. Accordingly, the voltage-clipping device 20 can achieve the characteristic properties as shown in FIG. 3.

Figure 6:
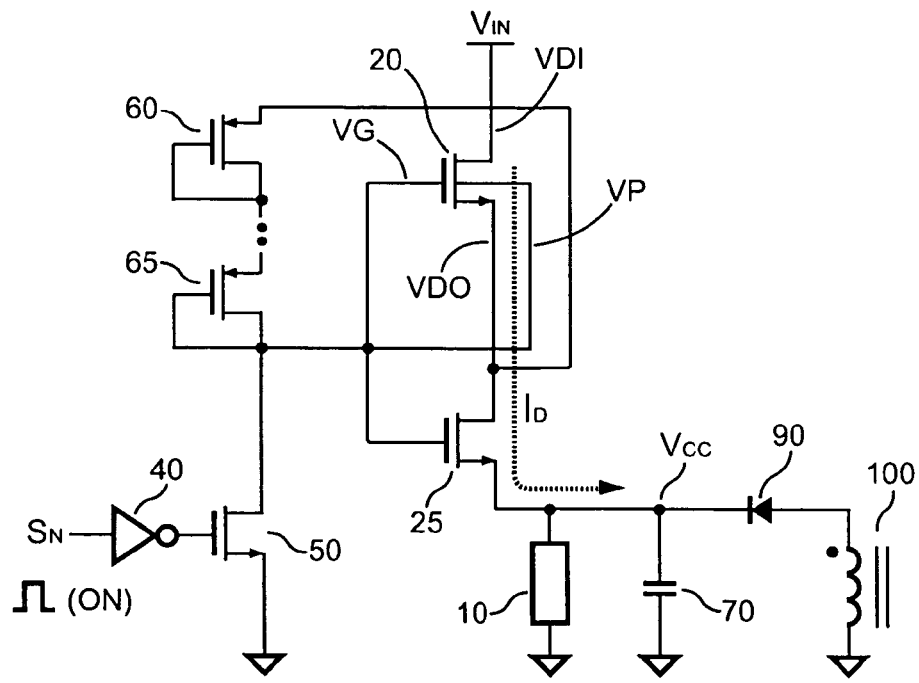
Figure 7:
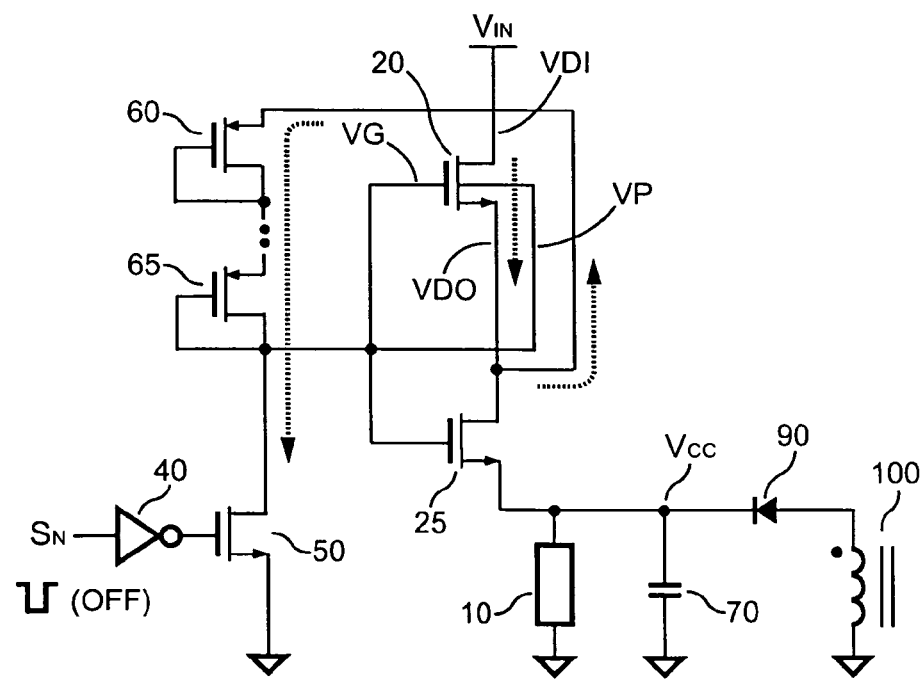
FIG. 7 shows the signal flow when the switching circuit is turned off.

FIG. 6 and FIG. 7 respectively show the on-stage and off-stage of a preferred switching circuit, in which a plurality of transistors 60~65 are operated as the resistive device 30. In FIG. 6, the transistor 50 is turned off. No current flows via transistors 60~65. The transistors 60~65 thus provide a zero bias or a floating bias for the voltage-clipping device 20. The transistors 60~65 further provide a same bias voltage between the gate terminal and the drain terminal of the transistor 25. Therefore, both the voltage-clipping device 20 and the transistor 25 are turned on. In FIG. 7, the transistor 50 is turned on to switch off the transistor 25. Meanwhile, a current flows through the transistor 50 and the transistors 60~65 that provides a negative bias to the voltage-clipping device 20. The voltage-clipping device 20 therefore clamps the maximum voltage for the transistor 25 to protect the transistor 25. Furthermore, once the transistor 25 is turned off, the current flowing via the voltage-clipping device 20 is relatively small and negligible. Therefore, the efficiency of the switching circuit is improved. In addition, the voltage-clipping device 20 and the resistive device 30 are suitable to be built in an integrated circuit, which achieves the objective of this invention.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching circuit for power converters, comprising:
   a voltage-clipping device, having an input terminal directly coupled to an input voltage, and a control terminal directly coupled to a gate terminal of the voltage-clipping device;
   a first transistor, having a drain terminal directly coupled to an output terminal of said voltage-clipping device, wherein a source terminal of said first transistor provides a supply voltage to a control circuit of the power converter;
   a second transistor, having a drain terminal directly coupled to a gate terminal of said first transistor and a control terminal of said voltage-clipping device; a gate terminal of said second transistor receives a control signal; and
   a resistive device, connected from said control terminal of said voltage-clipping device to an output terminal of said voltage-clipping device, wherein said resistive device provides a bias voltage to turn on said first transistor and said voltage-clipping device when said second transistor is turned off; said control signal turns on said second transistor for switching off said first transistor and providing a negative bias for said voltage-clipping device, wherein said voltage-clipping device clamps a maximum voltage for said first transistor.

2. The switching circuit as claimed in claim 1, said voltage-clipping device comprising:
   a P-type substrate;
   a first diffusion region and a second diffusion region, having N-type ions to form an N-type well in said P-type substrate;
   an input diffusion region, containing N+-type ions, forming an input region in said first diffusion region;
   an output diffusion region, containing N+-type ions, forming an output region in said second diffusion region;
   a P-type field block, formed in said N-type well; wherein said P-type field block is disposed adjacent to said input region for generating junction fields;
   an isolated P-type well, formed in said N-type well, wherein said isolated P-type well is formed in said second diffusion region;

a control diffusion region, containing P+-type ions, forming a control region in said isolated P-type well; and a channel, formed between said input region and said output region; wherein said control region controls a width of said channel to control a current flow in said channel.

3. The switching circuit as claimed in claim 1, wherein said resistive device is a resistor.

4. The switching circuit as claimed in claim 1, wherein said resistive device is formed with a plurality of transistors.

5. A switching circuit, comprising:
   a voltage-clipping device, receiving an input voltage, wherein the voltage-clipping device has a control terminal directly coupled to a gate terminal of the voltage-clipping device;
   a first transistor, directly connected in series with said voltage-clipping device for receiving and switching said input voltage outputted from the voltage-clipping device;
   a resistive device, coupled to said voltage-clipping device and said first transistor for providing a bias voltage to turn on said voltage-clipping device and said first transistor; and
   a second transistor, turning off said first transistor and providing a negative bias to said voltage-clipping device, wherein said voltage-clipping device clamps a maximum voltage for said first transistor, and said second transistor is controlled by a control signal.

6. The switching circuit as claimed in claim 5, said voltage-clipping device comprising:
   a P-type substrate;
   a diffusion region, having N-type ions to form an N-type well in said P-type substrate;
   an input diffusion region, containing N+-type ions, forming an input region in said N-type well;
   an output diffusion region, having N+-type ions, forming an output region in said N-type well;
   a P-type field block, formed in said N-type well, wherein said P-type field block is disposed adjacent to said input region for generating junction fields;
   an isolated P-type well, formed in said N-type well; wherein said isolated P-type well is disposed adjacent to said output region;
   a control diffusion region, containing P+-type ions, forming a control region in said isolated P-type well; and
   a conduction channel, formed between said input region and said output region; wherein said control region controls a width of said conduction channel to control a current flow in said conduction channel.

* * * * *